United States Patent
Charles et al.

(10) Patent No.: US 9,308,711 B2
(45) Date of Patent: Apr. 12, 2016

(54) METHOD FOR DISASSEMBLY OF TWO ELEMENTS WELDED BY ULTRASOUND AND ELEMENT ABLE TO BE WELDED BY ULTRASOUND TO ANOTHER ELEMENT TO THE IMPLEMENTATION OF SAID METHOD

(71) Applicant: Airbus Operations SAS, Toulouse (FR)

(72) Inventors: Julien Charles, Toulouse (FR); Guillaume Gallant, Lareole (FR); Denis Soula, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 302 days.

(21) Appl. No.: 13/677,557

(22) Filed: Nov. 15, 2012

(65) Prior Publication Data

US 2013/0192433 A1   Aug. 1, 2013

(30) Foreign Application Priority Data

Nov. 15, 2011 (FR) ..................... 11 60366

(51) Int. Cl.
| | |
|---|---|
| *B32B 7/04* | (2006.01) |
| *B29C 65/08* | (2006.01) |
| *B32B 37/00* | (2006.01) |
| *B32B 38/00* | (2006.01) |
| *B26D 1/547* | (2006.01) |
| *B29C 65/76* | (2006.01) |
| *B29C 65/00* | (2006.01) |
| *B29L 31/30* | (2006.01) |

(52) U.S. Cl.
CPC ............ *B32B 38/0004* (2013.01); *B26D 1/547* (2013.01); *B29C 65/08* (2013.01); *B29C 65/76* (2013.01); *B29C 66/0044* (2013.01); *B29C 66/30223* (2013.01); *B29C 66/532* (2013.01); *B29C 66/7392* (2013.01); *B29C 66/8122* (2013.01); *B29C 66/81427* (2013.01); *B29C 66/8322* (2013.01); *B29C 66/721* (2013.01); *B29C 66/7394* (2013.01); *B29C 2793/009* (2013.01); *B29L 2031/3076* (2013.01); *Y10T 83/04* (2015.04); *Y10T 428/24479* (2015.01)

(58) Field of Classification Search
CPC .... B26F 3/12; B26D 2001/008; B26D 1/547; B26D 1/5475; B26D 2001/0046; B21F 15/10; B26B 27/002; B26B 27/007
USPC ........... 428/99, 119, 131, 134, 136, 156, 157, 428/172, 195.1, 209; 156/73.1–73.6, 156/580.1–580.2; 264/442–445
See application file for complete search history.

(56) References Cited

U.S. PATENT DOCUMENTS

| | | | |
|---|---|---|---|
| 4,399,602 A * | 8/1983 | Hancock et al. | ............ 29/426.4 |
| 8,197,624 B2 * | 6/2012 | Beehag et al. | ............... 156/73.1 |
| 2006/0185176 A1 * | 8/2006 | Baeten et al. | .................. 30/308 |

* cited by examiner

*Primary Examiner* — Aaron Austin
*Assistant Examiner* — Megha Gaitonde
(74) *Attorney, Agent, or Firm* — Greer Burns & Crain Ltd.

(57) ABSTRACT

A method for disassembling two ultrasonically welded elements, one of the elements comprising, at a surface opposite the other element, an energy director that concentrates the heating during ultrasonic welding and forms a material junction between the two assembled elements after the ultrasonic welding. The method includes the steps of positioning a wire between the two assembled elements, so as to be secant to the energy director, said wire having suitable mechanical characteristics allowing it to cut the junction formed by the energy director and moving the wire between the two assembled elements so as to cut said junction.

9 Claims, 3 Drawing Sheets

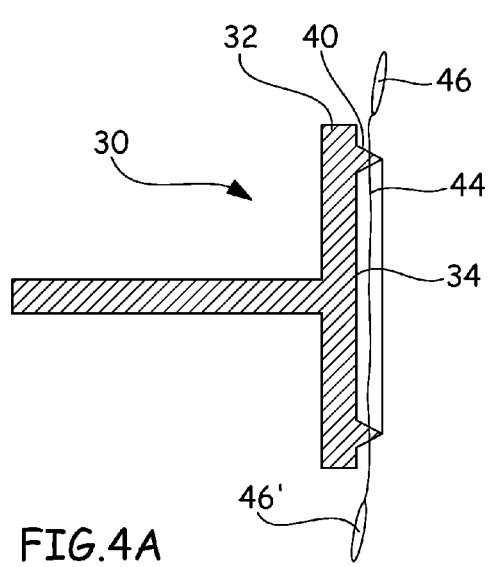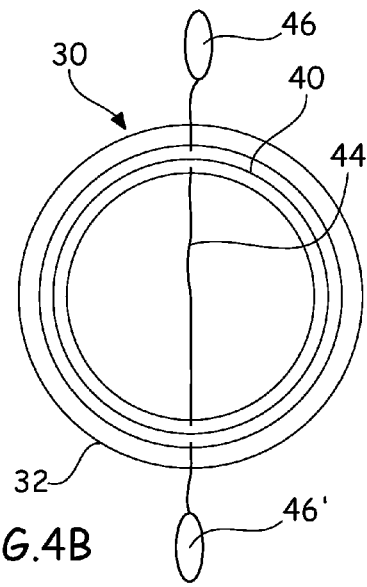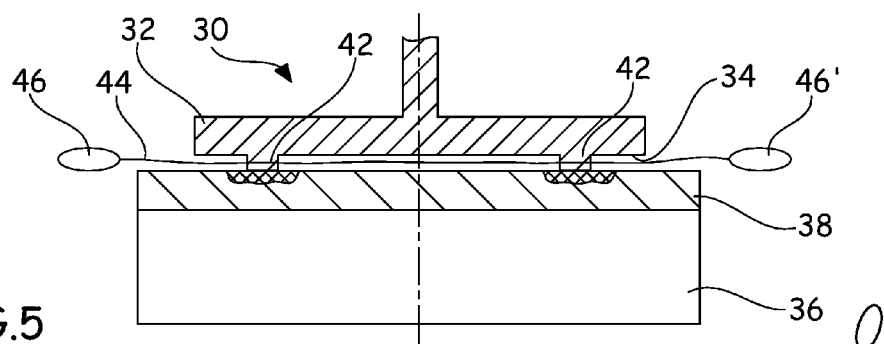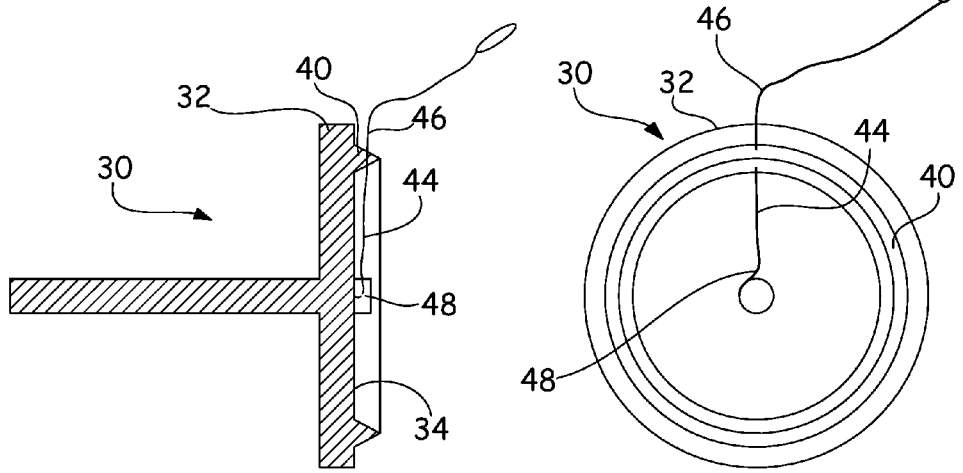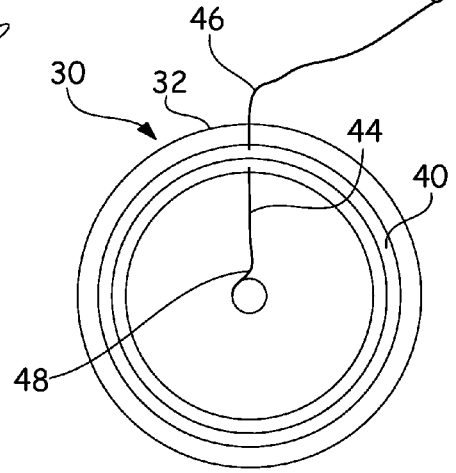

METHOD FOR DISASSEMBLY OF TWO ELEMENTS WELDED BY ULTRASOUND AND ELEMENT ABLE TO BE WELDED BY ULTRASOUND TO ANOTHER ELEMENT TO THE IMPLEMENTATION OF SAID METHOD

CROSS-REFERENCES TO RELATED APPLICATIONS

This application claims the benefit of the French patent application No. 11 60366 filed on Nov. 15, 2011, the entire disclosures of which are incorporated herein by way of reference.

BACKGROUND OF THE INVENTION

The present invention relates to a method for disassembling two ultrasonically welded elements as well as an element that can be ultrasonically welded to another element making it possible to implement said method. The invention is more particularly suitable for separating a holder or part of a holder ultrasonically welded to a wall.

According to one known embodiment illustrated in FIGS. 1 to 3, a holder 10 comprises a body 12, in the form of a cylindrical pellet with a front surface 14, that can be pressed against and connected to a wall 16 of an aircraft. The body 12 is extended by a rod 18 that makes it possible to connect a "light" element, in particular less than 2 kg, to the structure of the aircraft, for example such as an electrical cable, a tube, an insulating pad, cabin furniture, etc.

The holder 10 is made from a composite material, for example thermoplastic resin, which may or may not be reinforced with fibers.

The wall 16 of the aircraft is also made from a composite material, and for example comprises fibers embedded in a thermosetting resin matrix. According to the embodiment illustrated in FIGS. 2 and 3, the wall 16 comprises a coating 20 made from a thermoplastic material. Advantageously, the structure of the wall and its coating are co-polymerized, which makes it possible to obtain a solid connection between the coating and the wall.

As illustrated in FIG. 3, the holder 10 is fastened to the wall 16 using an ultrasonic welding method.

According to this technique, the holder is in contact with a vibration transmitter and its front surface 14 is pressed against the wall. Subsequently, by applying vibrations, heat is created at the interface between the holder and the wall up to their melting temperatures, allowing the molecular chains of the two elements in contact to mix in a diffusion area 22. After the vibrations have stopped and cooling has taken place, a solid junction is obtained.

To concentrate the heating, the front surface of the holder comprises at least one protruding shape called an energy director 24. As illustrated in FIG. 1, an energy director describes a ring approximately concentric to the body of the holder with a triangular section and a height in the vicinity of 1.5 mm. After the vibrations have stopped, the energy director 24 is deformed and forms a junction 26 between the holder and the wall, as illustrated in FIG. 3.

This assembly technique is in particular described in documents EP-2.004.388 and EP-1.423.256.

Following such an assembly, it may be necessary to reinstall a holder, for example if it is broken or due to a defective initial assembly. However, ultrasonic welding is a practically irreversible assembly technique. It is particularly irreversible inasmuch as the energy director(s) do not have the same geometry as before the assembly, and no longer have a pointed shape making it possible to concentrate the vibrational energy.

To disassemble the holder, a first solution consists of using a cutting and heating tool such as a blade and sliding it between the holder and the wall so as to destroy the junction 26. This solution is not fully satisfactory, as the risks of damaging the wall made from the composite material are high due to the geometry of the blade-shaped tool and the heat produced by the latter.

Another solution consists of using an ultrasonic knife, which is inserted between the holder and the wall in order to destroy the junction 26. As before, this solution is not fully satisfactory, as the risks of damaging the composite material wall are high.

Another solution consists of cutting out the holder using a rotating tool. This rotating tool has a cylindrical shape with at least one cutting edge at a front surface and an opening to allow the passage of the rod 18 of the holder, which may be used as axis of rotation. This tool also comprises two radial handles allowing it to be maneuvered.

This rotating tool makes it possible, through machining such as end milling, to remove material and thereby eliminate the holder.

Unlike the first two solutions, this solution makes it possible to limit the risks of damage to the wall. However, the surface of the wall may be scratched after this disassembly operation.

Document U.S. Pat. No. 5,591,364 proposes positioning a wire near the junction formed ultrasonically, then circulating an electric current in the wire so as to cause heating by Joule effect in order to cause the junction to soften. According to this document, the wire is stationary. As before, this solution is not fully satisfactory, as the risks of damage to the composite material wall are high due to the heating caused by the wire. Furthermore, the solution is not easy to implement inasmuch as it is difficult to position the wire correctly relative to the junction.

SUMMARY OF THE INVENTION

Consequently, the present invention aims to offset the drawbacks of the prior art by proposing a method for disassembling two elements assembled by ultrasound facilitating the disassembly and limiting the risks of damage to the wall.

To that end, the invention relates to a method for disassembling two ultrasonically welded elements, one of the elements comprising, at a surface opposite the other element, an energy director that concentrates the heating during ultrasonic welding and forms a material junction between the two assembled elements after the ultrasonic welding, wherein the method comprises of positioning a wire between the two assembled elements, so as to be secant to the energy director, said wire having suitable mechanical characteristics allowing it to cut the junction formed by the energy director, and move the wire between the two assembled elements so as to cut said junction.

BRIEF DESCRIPTION OF THE DRAWINGS

Other features and advantages will emerge from the following description of the invention, which is provided solely as an example, in reference to the appended drawings, in which:

FIG. 4A is a cross-section of a holder according to a first alternative of the invention, FIG. 4B is a front view of the holder of FIG. 4A, FIG. 5 is a cross-section illustrating a holder according to the invention secured to a wall by ultrasonic welding, FIG. 6A is a cross-section of a holder according to another alternative of the invention, FIG. 6B is a front view of the holder of FIG. 6A.

DETAILED DESCRIPTION OF THE PREFERRED EMBODIMENTS

Figure 1:
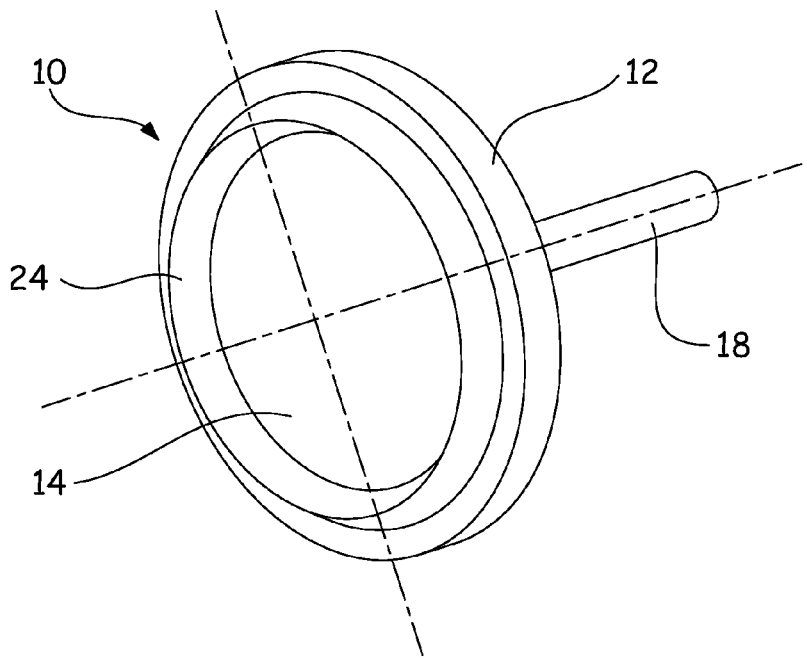
FIG. 1 is a perspective view of one example of a holder according to the prior art, more particularly showing an energy director before assembly.
Figure 2:
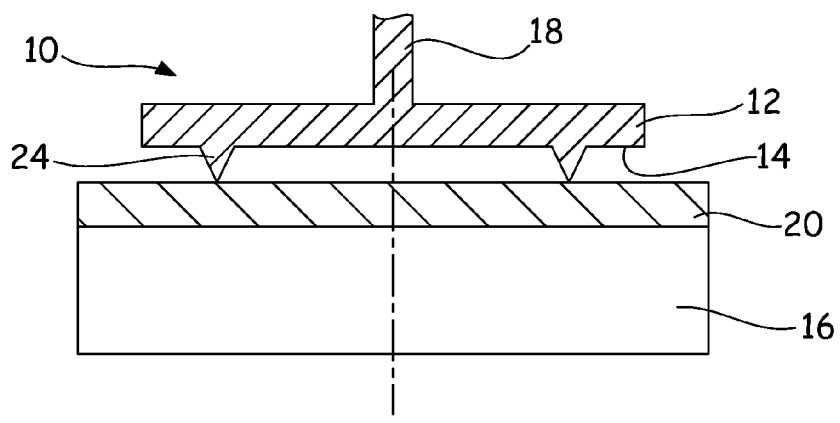
FIG. 2 is a cross-section illustrating the holder of FIG. 1 pressed against a wall before assembly.
Figure 3:
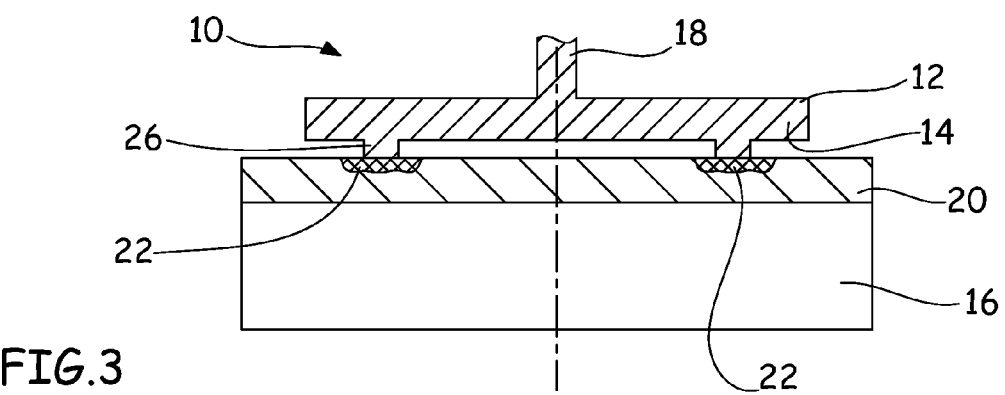
FIG. 3 is a cross-section illustrating the holder and the wall of FIG. 2 after assembly by ultrasonic welding according to the prior art.

FIG. 5 shows a holder 30 secured to a wall by ultrasonic welding.

According to one application and solely as an example, the holder 30 comprises a body 32, in the form of a cylindrical pellet with a front surface 34 capable of being pressed against and connected to a wall 36 of the aircraft. The body 32 is extended by a rod 38 that can make it possible to connect a "light" element, in particular less than 2 kg, to the structure of the aircraft, for example such as an electrical cable, a tube, an insulating pad, cabin furniture, etc.

The holder 30 is made from a composite material, for example thermoplastic resin, which may or may not be reinforced with fibers.

The wall 36 of the aircraft is also made from a composite material, and for example comprises fibers embedded in a thermosetting resin matrix. According to the embodiment illustrated in FIG. 5, the wall 36 comprises a coating 38 made from a thermoplastic material. Advantageously, the structure of the wall and its coating are copolymerized.

The holder 30 is secured to the wall 36 by ultrasonic welding.

Of course, the invention is not limited to this example, and may be applied to other technical fields, other elements that are assembled by ultrasonic welding, the elements being made from materials compatible with this assembly method.

In general, a first element, for example such as a holder, is connected to a second element, for example such as a wall, by ultrasonic welding, and one of the elements comprises a front surface 34 with at least one energy director 40.

In a known manner, an energy director 40 has a protruding shape relative to the front surface 34 with a reduced contact surface so as to concentrate the vibrational energy, and thus the heating.

According to one embodiment, an energy director 40 is in the shape of a ring approximately concentric to the body of the holder with a triangular section and a height in the vicinity of 1.5 mm. However, the invention is not limited to this energy director geometry. Thus, according to another example, the front surface 34 may comprise three energy directors each in the shape of a cone.

Generally, the front surface comprises at least one energy director with a reduced contact surface before assembly so as to concentrate the vibrational energy, and therefore the heating, during ultrasonic welding, and which forms a material junction 42 between the two assembled elements after the ultrasonic welding.

The energy director 40 and the assembly method by ultrasonic welding will not be described further, as they are known by one skilled in the art, and are in particular described in documents EP-2.004.388 and EP-1.423.256 which are incorporated herein by reference.

According to the invention, one of the two elements assembled by ultrasonic welding, in particular the holder 30, comprises a wire 44 whereof one portion is included in the energy director 40 during manufacture thereof, said wire 44 having suitable mechanical characteristics, in particular in terms of torsional and shear strength, making it able to cut the junction 42 formed by the energy director 40.

This wire 44 may be metal or fibrous.

According to one embodiment, the wire 44 is made from a nonflammable and non-electrically conducting fibrous material, for example such as braided glass fiber, with a small diameter, in the vicinity of 0.50 to 1 mm, to provide a scale.

Alternatively, the wire 44 may be made from an electrically conducting material.

The nature and diameter of the wire 44 are adjusted by one skilled in the art, in particular as a function of the material of the energy director 40, so as to be able to cut the junction 42 formed by the latter after the ultrasonic welding assembly.

Advantageously, in the energy director 40, the portion of the wire 44 is arranged in a plane substantially parallel to the front surface 34.

The wire 44 passes through the energy director at least once and comprises portions arranged on either side of the portion included in the energy director. In the presence of several energy directors, a single wire 44 may pass through all of the energy directors. Alternatively, it is possible to provide several wires, each passing through one or more energy directors.

According to the embodiment illustrated in FIGS. 4A and 4B, the wire 44 passes twice through the energy director. According to the embodiment illustrated in FIGS. 6A and 6B, the wire 44 passes once through the energy director.

According to the invention, the wire 44 comprises at least one portion 46 that can be grasped to be able to maneuver it.

According to a first alternative illustrated in FIGS. 4A and 4B, the wire 44 comprises two portions 46, 46' that can be grasped.

According to another alternative, illustrated in FIGS. 6A and 6B, the wire 44 comprises a portion 46 that can be grasped and another portion 48 that is stationary relative to one of the two assembled elements, in particular connected to the holder. According to this alternative, the wire 44 comprises clipping means at a first end and means for connecting the wire to one of the two assembled elements, in particular the holder, at a second end.

The portion(s) capable of being grasped correspond to the ends of the wire 44.

In order to facilitate gripping of the wire, the portions 46, 46' capable of being grasped comprise gripping means. Depending on the case, the gripping means may be a loop formed by the wire 44, or tabs secured to the wire. As an example, the tabs are made from hard plastic or made up of a piece of cardboard inside which the wire 44 is glued.

Other solutions may be considered to facilitate gripping of the wire.

In the case of a holder made from a thermoplastic material, made by plastic injection molding, the wire 44 is inserted into the mold before the injection of the material. If necessary, the wire may be locally coated with an anti-adhesive film of the polytetrafluoroethylene type, to limit the risks of sticking of the thermoplastic material.

The fact that a portion of the wire is included in the energy director allows the wire 44 to be connected to the element to be welded, which does not create any modifications in the ultrasonic welding assembly method, which is in line with that used to weld the wireless holders 44 of the prior art.

Preferably, the wire is at a distance from the contact surface of the energy director 40 so as not to interfere with the ultrasonic welding operation. Advantageously, the wire is positioned in the portion of the energy director close to the front surface 34, corresponding to one third of its height.

To disassemble the holder 30, the operator grasps one or two portions 46, 46' of the wire 44 and exerts a force so as to cause a rotary movement of the or some of the portions of the wire 44 around the junction 42 formed by the energy director 40. This rotational movement of the wire causes cutting of the junction and separation of the two previously assembled elements.

According to the alternative illustrated in FIGS. 4A and 4B, the rotational movement is done approximately over a half turn (180°). According to the alternative illustrated in FIGS. 6A and 6B, the rotational movement is done approximately over one complete revolution (360°).

Since the wire is made from a stronger material than that of the junction 42, the latter is cut by the wire.

Alternatively, it is possible to circulate an electric current in the wire 44, so as to cause heating of the wire by Joule effect, which favors the cutting action of the wire 44. Unlike the prior art, the disassembly essentially results from the cutting action of the wire and not its heating, which in fact only favors the cutting action. This heating is not sufficient by itself to obtain the rupture of the junction.

Figure 7:
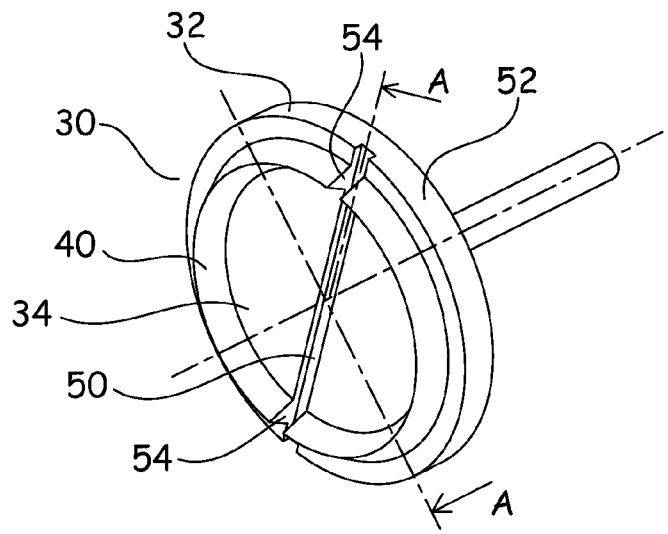
FIG. 7 is a perspective view of a holder according to another alternative of the invention.
Figure 8A:
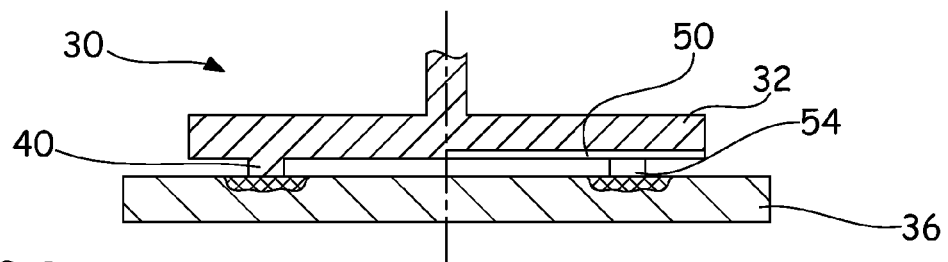
FIG. 8A is a cross-section of the holder of FIG. 7 along the broken line A-A secured to a wall.
Figure 8B:
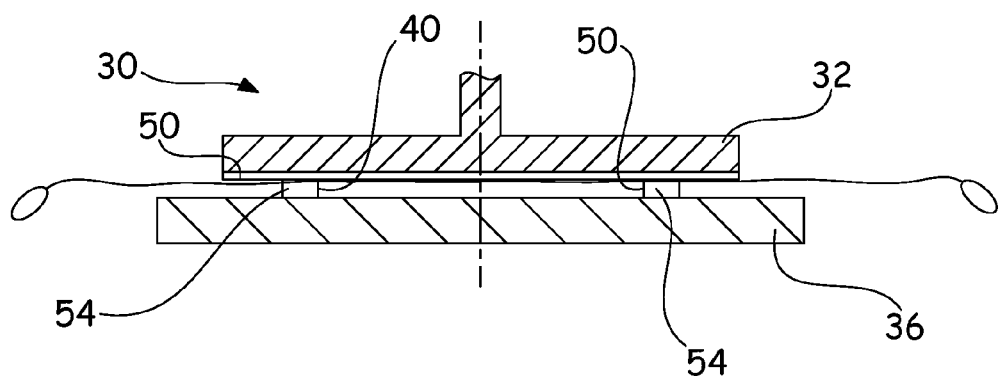
FIG. 8B is a cross-section of the holder of FIG. 7 in a plane containing a groove, after insertion of a wire making it possible to separate it from the wall.

In FIGS. 7, 8A and 8B, a holder 30 is shown according to another alternative. As before, according to one embodiment, a holder 30 comprises a body 32 in the form of a cylindrical pellet with a front surface 34 that can be pressed against and connected to a wall 36 of the aircraft.

At its front surface 34, it comprises at least one energy director 40.

According to this alternative, the holder 30 comprises at least one groove 50 making it possible to position at least one wire 44 between the support 30 and the wall 36 on which it is fastened. This groove has a section suitable to slide a wire between the holder 30 and the wall 36 on which it is fastened.

The groove 50 is secant with the energy director 40 at least at one point. Advantageously, as illustrated in FIG. 7, the groove 50 emerges at the peripheral surface 52 of the holder 30. According to one embodiment, the groove 50 extends along a line corresponding to a diameter.

Preferably, at a point of intersection with a groove, the energy director 40 comprises a notch 54. According to one embodiment illustrated in FIG. 7, the notch 54 extends over the entire height of the energy director 40 and forms a slit. Alternatively, the notch 54 extends only over part of the height of the energy director, more particularly one third of its height from the front surface 34, and forms a needle eye in which the wire 44 can be inserted.

Thus, according to the alternative illustrated in FIGS. 7, 8A and 8B, the wire 44 may not comprise any portion included in the energy director 40 during its production.

The wire used to separate the elements assembled by ultrasonic welding can be connected to the holder using any suitable means. Alternatively, it may not be connected to the holder and a same wire may be used to separate several holders successively.

Whatever the alternative, at least one of the assembled elements comprises means for positioning at least one wire 44 between two assembled elements, so as to be secant to the energy director. To separate the two elements, it is then necessary only to move the wire between the two assembled elements so as to cut the junction(s) 42 formed by the energy director after the ultrasonic welding.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A pair of elements comprising:
a first element; and
a second element ultrasonically welded to the first element, said second element comprising, at a front surface, an energy director that concentrates the heating during ultrasonic welding and forms a material junction with a corresponding surface of the first element after the ultrasonic welding and at least one wire, one portion of which is secant to, is molded within, and passes through the energy director, said wire having suitable mechanical characteristics making it able to cut the energy director to separate the second element from the first element, wherein the wire is movable between the first and second elements so as to cut said junction.

2. The pair of elements according to claim 1, wherein the wire comprises gripping means.

3. The pair of elements according to claim 2, wherein the wire comprises gripping means on either side of the energy director.

4. The pair of elements according to claim 2, wherein the wire comprises gripping means at a first end and means to connect the wire to the second element at a second end.

5. The pair of elements according to claim 1, wherein the portion of the wire included in the energy director is positioned in a plane substantially parallel to the surface comprising the energy director.

6. The pair of elements according to claim 1, wherein the wire is made from a fibrous material.

7. The pair of elements according to claim 1, wherein the wire has a diameter of approximately 0.50 to 1 mm.

8. The pair of elements according to claim 1, wherein the wire is made from an electrically conductive material.

9. A pair of elements comprising:
a first element;
a second element ultrasonically welded to the first element, said second element comprising, at a front surface, an energy director that concentrates the heating during ultrasonic welding and forms a material junction after the ultrasonic welding with a corresponding surface of the first element after the ultrasonic welding; and
a wire attached to the second element at a first location and passing through the energy director at a second location, the wire having suitable mechanical characteristics making it able to cut the energy director while remaining attached to the second element at the first location, wherein said wire separates the energy director subsequent to ultrasonic welding of the second element to the first element to free the second element from the first element.

* * * * *